United States Patent
Cox et al.

(10) Patent No.: US 6,625,351 B2
(45) Date of Patent: Sep. 23, 2003

(54) INK-JET PRINTING OF COLLIMATING MICROLENSES ONTO OPTICAL FIBERS

(75) Inventors: W. Royall Cox, Plano, TX (US); Chi Guan, Richardson, TX (US)

(73) Assignee: MicroFab Technologies, Inc., Plano, TX (US)

( * ) Notice: Subject to any disclaimer, the term of this patent is extended or adjusted under 35 U.S.C. 154(b) by 263 days.

(21) Appl. No.: 09/783,343

(22) Filed: Feb. 14, 2001

(65) Prior Publication Data

US 2001/0033712 A1 Oct. 25, 2001

Related U.S. Application Data

(60) Provisional application No. 60/183,298, filed on Feb. 17, 2000.

(51) Int. Cl.$^7$ ................................................ G02B 6/32
(52) U.S. Cl. .............................. 385/33; 385/31; 385/34; 385/92; 385/93
(58) Field of Search .......................... 385/31, 32, 33, 385/34, 35, 123, 88, 92, 139, 93

(56) References Cited

U.S. PATENT DOCUMENTS

| | | | | |
|---|---|---|---|---|
| 4,380,365 A | * | 4/1983 | Gross ........................... | 385/33 |
| 5,231,684 A | * | 7/1993 | Narciso et al. ............... | 385/80 |
| 5,281,301 A | * | 1/1994 | Basavanhally ............... | 216/24 |
| 5,293,438 A | * | 3/1994 | Konno et al. ................. | 385/35 |
| 5,346,583 A | * | 9/1994 | Basavanhally ............... | 216/26 |
| 5,598,493 A | * | 1/1997 | Bonham et al. .............. | 385/33 |
| 5,707,684 A | * | 1/1998 | Hayes et al. ................. | 427/162 |
| 6,549,704 B2 | * | 4/2003 | Ukrainczyk .................. | 385/33 |

OTHER PUBLICATIONS (Nakama et. al.), U.S. patent application Publication, No.: U.S. 2002/0131700A1, published Sep. 19, 2002.*
(Kroupenkine), U.S. patent application Publication, No.:U.S. 2003/0081896A1, published May 1, 2003.*
(Cox et. al.), U.S. patent application Publication, No.: U.S. 2001/0033712A1, published Oct. 25, 2001/.*

* cited by examiner

*Primary Examiner*—Brian Healy
(74) *Attorney, Agent, or Firm*—Locke Liddell & Sapp LLP

(57) ABSTRACT

Collimating microlenses are "printed" from optical polymeric materials on the ends of optical fibers using ink-jet technology. In one embodiment the optical fibers are inserted into a collet, a stand-off distance from the open upper end of the collet. The open upper end is filled with optical fluid and a microlens is formed thereon to collimate light exiting the fiber through the microlens. In another embodiment optical fibers from a "ribbon" are separated and installed into a ferrule having multiple openings therethrough. In the same manner as in the collet embodiment, the ferrule openings serve as a mold for the lens formation with the end of the fiber being located at the focal distance of the lenslet formed in an on the ferrule. A non-wetting coating can serve to control spreading of the fluid optical material and allow lens radius control as well. The microlenses are hardened after formation.

23 Claims, 3 Drawing Sheets

INK-JET PRINTING OF COLLIMATING MICROLENSES ONTO OPTICAL FIBERS

CROSS-REFERENCE TO RELATED APPLICATIONS

This application is a continuation-in-part of Provisional Application No. 60/183,298, filed Feb. 17, 2000 by the same inventors for which priority benefit is claimed.

BACKGROUND OF THE INVENTION

1. Cross-Reference to Related Patent

This application relates to U.S. Pat. No. 5,707,684, titled "Method for Producing Micro-Optical Components" issued Jan. 13, 1998 to Donald J. Hayes and W. Royall Cox, the patent being incorporated herein by reference in its entirety.

2. Field of the Invention

The present invention relates to a method of applying lenses to optical fibers which collimate transmitted light.

3. Background of the Prior Art

Optical fibers are increasingly used in datacom and telecom optoelectronic devices and systems for transmitting data or signals. Many applications require a "connection" between fibers or an array of fibers where there is a free space between them. An example of such use is where it is desired to transmit a signal from an optical fiber to a defraction grating or an optical switch. Defraction gratings, for example, are very delicate and cannot withstand contact or direct connections with optical fibers. Defraction gratings may be used in what might be called wave length division multiplexing which allows optical fibers to carry different signals and different streams of data at the same time. These actual uses are beyond the scope of this invention which merely relates to a new way of collimating the light exiting an optical fiber so that the light travels in straight lines from the end of a fiber or fibers to its destination. Prior art collimation of light exiting an optical fiber is typically achieved by mounting of a prefabricated collimating lens, such as an RGRIN (radial gradient index of refraction) rod at the end of the optical fiber at the appropriate distance from its tip or by thermally sculpting the tip of the fiber to achieve the desired collimating effect. These RGRIN rods require diffusion and they are very expensive to fabricate and install in a fixture in line with an optical fiber. This prior art thus has a disadvantage of both being difficult and costly to achieve. It would be desirable to be able to produce low-cost, high throughput fabrication of collimating microlenses on optical fibers, which would greatly facilitate design and assembly of optoelectronic systems and devices utilizing free-space coupling of fibers to optical components such as other fibers, detectors, gratings, prisms, etc. in both datacom and telecom systems.

SUMMARY OF THE INVENTION

This invention provides, for the first time, an inexpensive way of adding significant value to optical fibers, by utilizing the ink-jet printing method of dispensing optical material for automated, in-situ fabrication of collimating micro-optics at the ends of fibers. The flexibility of this data-driven method also enables variation of the printed microlens radius of curvature and the use of optical materials of differing properties (e.g., indexes of refraction), in order to achieve a range of collimating beam widths for differing types of fibers, e.g., single-mode or multi-mode, and of differing specifications with respect to core diameters, numerical apertures, etc.

The first step in fabricating collimating microlenses for the ends of optical fibers by means of ink-jet printing comprises selecting a desired microlens geometry. The specific geometry of a plano-convex microlens needed to collimate the output light from a given fiber is determined by ray trace modeling, using the fiber core diameter and core and cladding indexes of refraction, along with the desired beam collimation width, as input parameters. To achieve collimation of the output light, the lenslet must be located coaxially with the fiber core and offset from the fiber tip by a distance equal to the lenslet back focal length, so that its focal point is at the surface of the fiber core. The diameter of the microlens must be large enough to capture all of the diverging light from the fiber, and its radius curvature is determined by modeling to achieve collimation at the targeted beam width.

To achieve, at relatively low cost, the geometry required for fiber output collimation by the ink-jet printing method a hollow collet is provided which has an opening therethrough sized to accept an optical fiber wherein the collet has open lower and upper ends. The collets are cut from drawn tubes to several millimeters in length (e.g., 5 mm), preferably quartz tubes and fire-polished at both ends. The tip of an optical fiber is inserted into the open lower end of the collet leaving the tip of the optical fiber spaced from the upper end of the collet by a standoff distance which will place the focal length of the microlens to be formed at the tip of the optical fiber. The cleaved and sheathing-stripped end of the fiber is inserted into the collet until the distance between the fiber tip and the other end of the collet is at the required lenslet offset distance, using a microscope and mounting fixture. The optical fiber is fixed in the collet by means of a drop of UV-curing epoxy applied to the fiber at the lower end of the collet and cure bonded in place. After curing of the bonding adhesive, the fiber-collet assembly is mounted vertically, open end up, to the printing station substrate chuck and aligned to the print axis. The microlens material is preferably UV-curing optical epoxy. Droplets of liquid microlens material are deposited into the open upper end of the collet by means of an ink-jet printhead in drop-on-demand mode until the opening within the collet is filled and a microlens of the desired geometry is formed thereon. The microlens material is then cured by application of ultra-violet radiation and/or heat.

In a preferred embodiment of the invention, a ferrule is used to form microlenses individually and nearly simultaneously for an array of optical fibers. The ferrule has an upper-side and a lower-side, with an array of closely-spaced openings therethrough that are sized to receive an optical fiber. A single optical fiber can be passed through each opening so that an array of fibers can be placed in the ferrule to permit an array of lenses to be produced at nearly the same time. The tip of an optical fiber is inserted into the open lower end of a ferrule opening leaving the tip of the optical fiber spaced from the upper end of a ferrule opening by a standoff distance which will place the focal length of the microlens to be formed at the tip of the optical fiber. The cleaved and sheathing-stripped end of the fiber is inserted into the ferrule opening until the distance between the fiber tip and the other end of a ferrule opening is at the required lenslet offset distance, using a microscope and mounting fixture. The optical fiber is preferably fixed in the opening by means of a drop of UV-curing epoxy applied to the fiber at the lower end of the ferrule opening and cure bonded in place. After curing of the bonding adhesive, the fiber-ferrule assembly is mounted vertically, open end up, to the printing station substrate chuck and aligned to the print axis. The microlens material is preferably UV-curing optical epoxy. Droplets of liquid microlens material are deposited into the open upper end of the ferrule openings by means of an ink-jet printhead until the ferrule openings are filled and microlenses of the desired geometry are formed thereon. The microlens material is then cured by application of ultraviolet radiation and/or heat.

BRIEF DESCRIPTION OF THE DRAWINGS

Other advantages and features of the invention will become more apparent with reference to the following detailed description of presently preferred embodiments thereof in connection with the accompanying drawings, wherein like reference numerals haven been applied to like elements, in which.

DESCRIPTION OF THE PREFERRED EMBODIMENT

Figure 1:
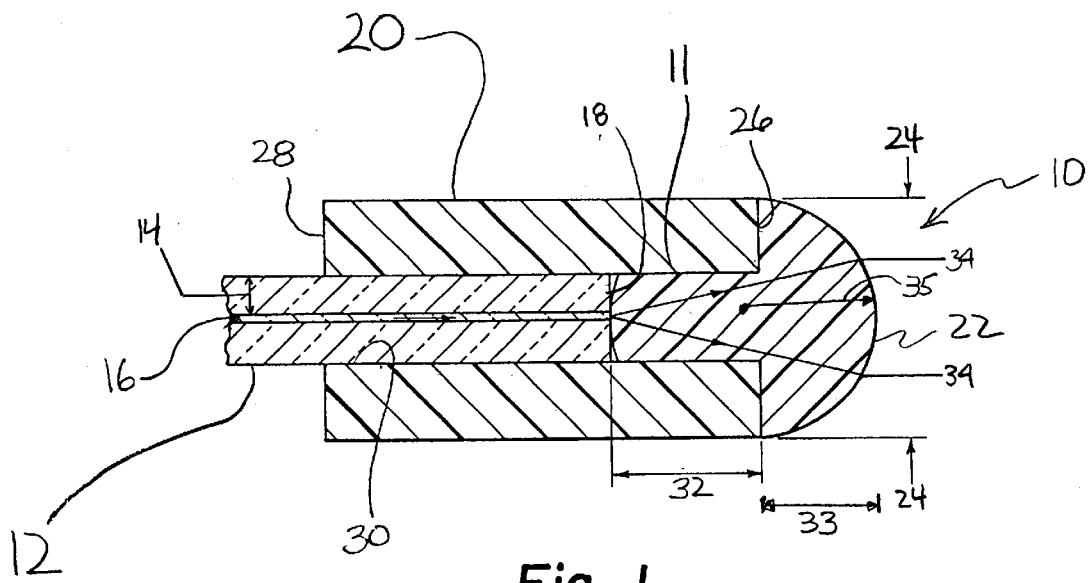
FIG. 1 is a schematic cross-sectional view showing the placement of an optical fiber within a collet for producing a microlens according to the method of the present invention so that light rays are collimated upon exiting the core of the optical fiber.

The present invention applies ink-jet printhead technology to the fabrication of collimating microlenses for optical fibers. According to the present invention, a first step of microlens fabrication requires selecting a desired microlens geometry. The diameter of the microlens must be large enough to capture most all of the light from the optical fiber and the collimation of light rays determines the radius of curvature of the lens. As is known to one of ordinary skill in the art, the diameter 24 and the radius of curvature 35, as shown in FIG. 1, necessary for collimation of light rays may be determined by ray-trace modeling. Ray-trace modeling may be performed with any computer software program designed for the purpose such as the Zemex Optical Design Program 9.0 (Focus Software, Inc., P.O. Box 18228, Tucson Ariz. 85731).

A collimating microlens 10 is shown in FIG. 1 on the end of an optical fiber 12. Optical fiber 12 has a cladding 14 on the outside and a core portion 16 on the inside at the center of the cladding. Light travels through the core 16 to exit primarily from the core at the end 18 of the optical fiber 12. The microlens or lenslet 10 is formed at the end 18 of optical fiber 12 with the aid of a collet 20 in a manner to be described below. Microlens 10 has radiused outer surface 22 formed in the shape of a hemisphere or a section of a sphere and a pedestal portion 11 which extends back to the tip 18 of optical fiber 12. Microlens 10 has a diameter 24 which coincides with the diameter of collet 20.

Collet 20 comprises an upper end 26 and a lower end 28 and has an opening 30 extending along its long-axis that receives optical fiber 12. The diameter of the collet opening 30 is sized to receive the optical fiber 12. Collet 20 functions as a mold and a sleeve to hold the optical fiber. Collet 20 can be made of any material, but is preferably made of a material, or a combination of materials, that is substantially transparent to ultraviolet light such as glass or quartz. The collet is preferably cylindrical as shown but could be a different overall shape.

Again referring to FIG. 1, optical fiber 12 is inserted into the lower end 28 of the collet opening 30 up to the standoff distance 32. Standoff distance 32 is the distance the optical fiber must be located from the end of the collet that will place the focal length of the microlens or lenslet 10 at the fiber core 16 at the end of the optical fiber 18 as shown. Standoff distance 32 permits a microlens or lenslet 10 to be formed by depositing lens/optical material so that light rays 34 collimate upon exiting the optical fiber 12, or conversely, focused on the core 16 of the optical fiber 12 when entering the lens, depending upon the use of the fiber.

Figures 2A, 2B, 2C, 2D:
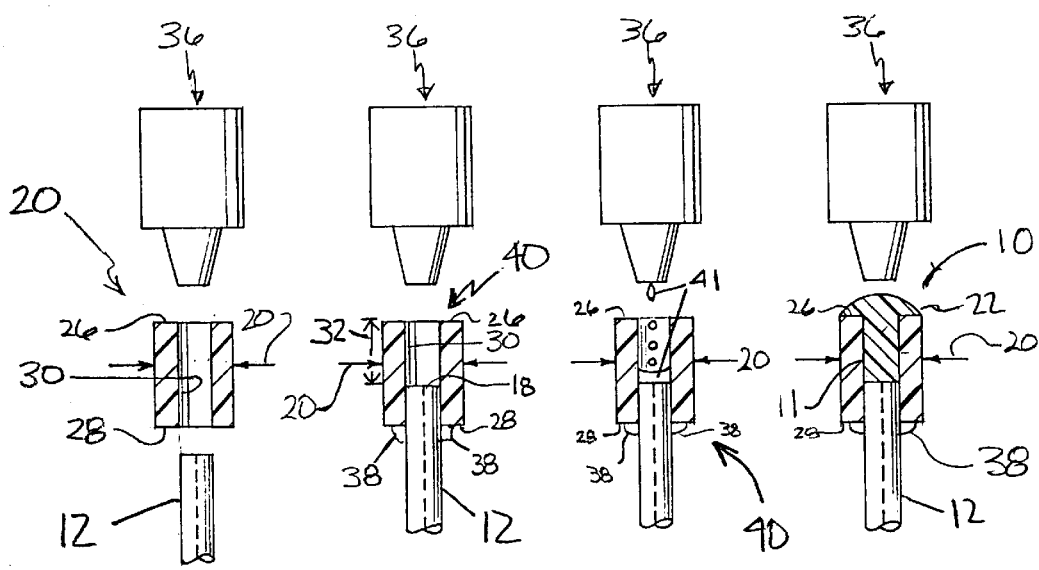
FIG. 2A is a side-view in elevation showing the relationships between an optical fiber, collet, and ink-jet printhead prior to insertion of the optical fiber.
FIG. 2B is a side-view in elevation showing the relationships between an optical fiber, collet, and the ink-jet printhead after insertion of the optical fiber.
FIG. 2C is a side-view in elevation showing the relationships between an optical fiber, collet with portions thereof cut away, and the ink-jet printhead during deposition of microlens material according to the method of the present invention.
FIG. 2D is a side-view showing the relationships between an optical fiber, collet, ink-jet printhead, and final placement of microlens material deposited according to the method of the present invention.

FIGS. 2A–2D illustrate the use of collet 20 in fabricating a collimating microlens on an optical fiber. In FIG. 2A, an ink-jet printhead 36 is aligned above collet opening 30 and is aligned co-axially with the opening 30. Prior to placing the fiber in collet 20, the optical fiber 12 is prepared for insertion by removing the outer protective sheath of the fiber, if any, down to the cladding. This is not shown in the drawings. In FIG. 2B, the cleaved end 18 of optical fiber 12 is inserted into the lower end 28 of the collet up to the standoff distance 32. Collet opening 30 is sized to receive the fiber 12, preferably about 5 microns larger than the diameter of the optical fiber 12. To hold fiber 12 in place in collet 20 during application of this invention, a bonding adhesive 38 is applied to collet 20 and the fiber 12 at the lower end 28 of the collet 20. The adhesive may be any material that will hold the fiber in place in the collet, preferably an epoxy, and more preferably, one curable by heat or ultraviolet (UV) light. After curing of bonding adhesive 38 the fiber-collet assembly 40 is mounted vertically, with upper end 26 of collet 20 in uppermost position and collet 20 aligned under the ink-jet printhead 36 so that collet opening 30 can receive the microlens material 41.

FIG. 2C illustrates deposition of microlens material 41 by an ink-jet printhead. Methods of operating an ink-jet printhead to deposit optical polymeric materials in a fluid state are disclosed in U.S. Pat. Nos. 5,498,444 and 5,707,684 entitled Method for Producing Micro-Optical Components by the assignee hereof, the disclosures of which are incorporated by reference. Fluid microlens material 41 is deposited into the upper end 26 of collet 20 by ink-jet printhead 36 until opening 30 within the collet 20 is filled and a microlens of the desired geometry is formed. The microlens material should be deposited in droplets along the center axis of the opening rather than along the sides of the collet opening 30 to avoid surface tension forces between the microlens material and the collet 20 which could result in incomplete filling or voids in the final product. Droplets of microlens material are deposited up to the upper surface 26 of the collet and then are deposited further so that the material extends above collet 20 and assumes a radiused outer surface 22 shown in FIGS. 1 and 2D to form a collimating microlens 10.

Microlens material 41 can be any material that is fluid, can be deposited by the ink-jet method, and permits light transmission such as glass, plastic, epoxy, etc. UV-curable optically transparent epoxies are preferred. Some specific commercial materials which have been suitable for forming collimating microlenses include Summers Optical SK9 (Refractive Index 1.49) by Summers Optical, Inc., P.O. Box 162, Fort Washington, Pa. 19034; Norland No. NOA-73 (Refractive Index 1.56) by Norland Products, Inc., P.O. Box 7145, New Brunswick, N.J. 08902); and Epotek No. OG-146 (Refractive Index 1.48) by Epogy Technology, Inc., 14 Fortune Drive, Billerica, Mass. 01821. In the case where the microlens material is curable by a particular means such as heat or light, it is preferred, although not necessary, that the collet be made of a material that is compatible with such method of curing. For instance, the collet may be made of glass or quartz to permit the transmission of UV light. The viscosity of the microlens material at room temperature is preferably not over 1000 centipoise. At application, the viscosity of the microlens material is preferably 40 centipoise or less in order to be able to deposit microdroplets from ink-jet printhead 36. If it is not, the viscosity can be lowered by either heating or by mixing with a solvent. If a solvent is used, heat application after deposition of the material is required to drive off the solvent but because this often results in shrinkage, distortion, or both, of the lens, it is not preferred. FIG. 2D illustrates the final stage of the collet embodiment of the collimating microlens fabrication of the present invention.

Figure 5:
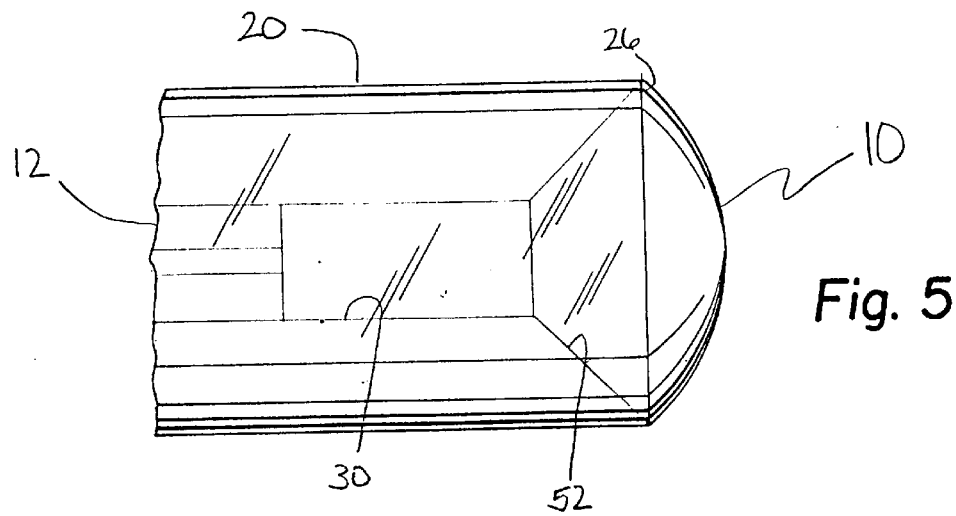
FIG. 5 is a representation of a photograph of a collet in one embodiment for placement of microlens material according to the method of the present invention wherein the microlens is formed in the end of a collet having a conical opening into the interior.

FIG. 5 illustrates an embodiment of the collet 20 showing that the upper end 26 of the opening 30 may be widened to facilitate deposition of microlens material. The resulting conical opening 52 reduces the probability that droplets of microlens material will undesirably stick to the sides of collet opening 30 before the fluid material contacts the optical fiber 12 or microlens material 41 deposited earlier on the fiber.

Figure 3A:
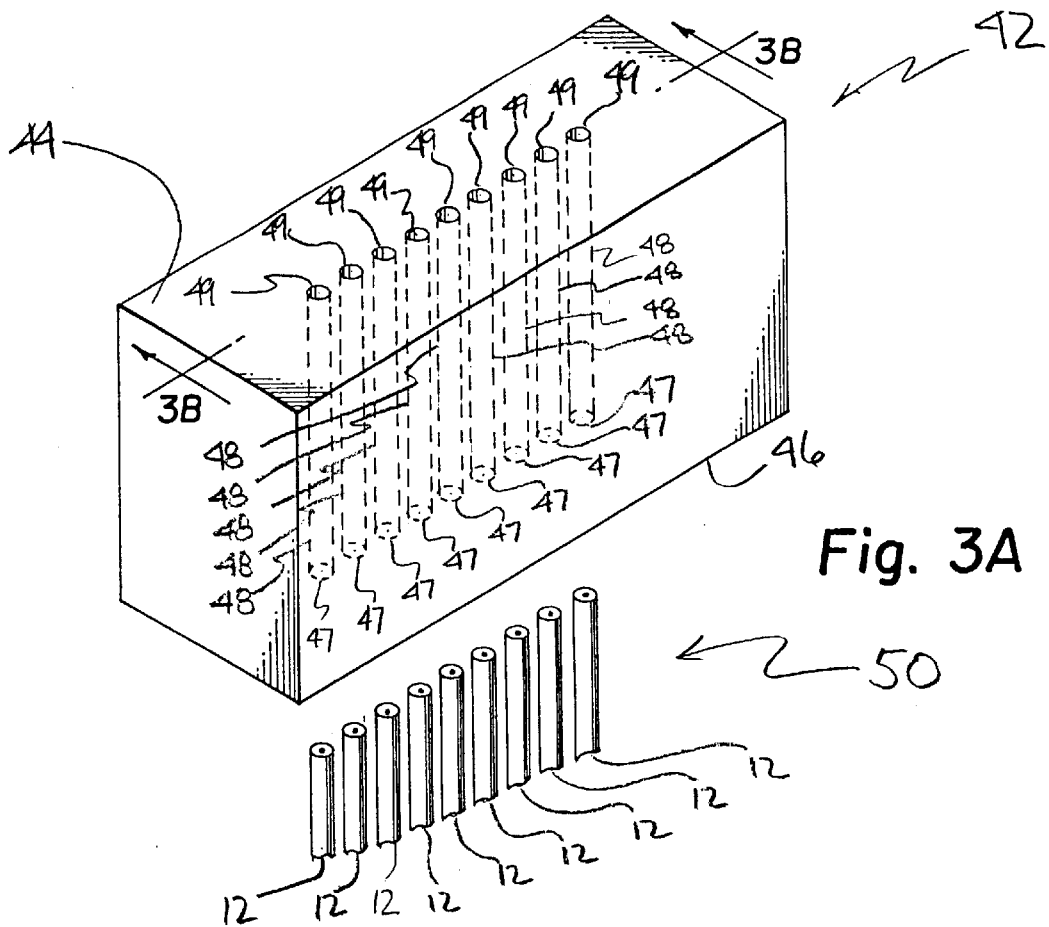
FIG. 3A is a perspective view of a ferrule with multiple openings therethrough for microlens fabrication for an array of optical fibers according to the method of the present invention.

Another embodiment of the present invention uses a ferrule 42 as shown in FIG. 3A. The ferrule 42 is a support structure, capable of holding a plurality of optical fibers and serving as an alignment device and a mold. Ferrule 42 has an upper end 44, a lower end 46, and a plurality of openings 48 extending therethrough to receive a fiber array 50. Openings 48 are sized to receive individual optical fibers 12 from array 50 and are closely spaced, preferably having a center-to-center distance between the openings on the order of 250 microns. Although openings 48 receive optical fibers 12, they are preferably sized a micron or so larger than the fiber so that friction is sufficient to hold them. Other means for holding them are contemplated, for example, such as by the use of adhesives as indicated in the previous embodiment. As is often the case within the art, individual fibers of the array are laterally attached to another fiber. Depending upon the type of the array 50, the fibers 12 may need to be separated in order to place each fiber 12 into a ferrule opening 48. For the purposes of the present invention, the ferrule is defined as a means for alignment and for holding at least one, but also an entire array, of fibers and also serves to mold the microlens material into a collimating microlens. The ferrule is basically a conventional fiber ribbon connector with each opening having a diameter at least one micron longer than that of the fiber to be inserted. The ferrule may be made of any material compatible with industry standards, namely, that the material be able to withstand up to 85° C. and 85% humidity. In a preferred embodiment the ferrule is made of plastic but any materials with similar behavior could be used.

The upper surface 44 of the ferrule around the ferrule openings 48 is preferably covered with a dried de-wetting solution (not shown) such as FC-724 (3M Corp., St. Paul, Minn.) or other flourinated acrylics, or other compounds that function similarly. Because the plurality of ferrule openings are in very close proximity to each other, coating the upper surface 44 of the ferrule around the ferrule openings 48 with a de wetting solution retards dispersion of microlens material across the upper surface and into other ferrule openings. Moreover, the de-wetting solution permits a radiused microlens to be built above the upper surface of the ferrule with the continued deposition of microlens material. This permits fabrication of microlenses with very short radii of curvature. In one embodiment of the invention, the diameter of a ferrule opening 48 is 126 microns to receive 125 micron fibers typically used in the industry.

Figure 3B:
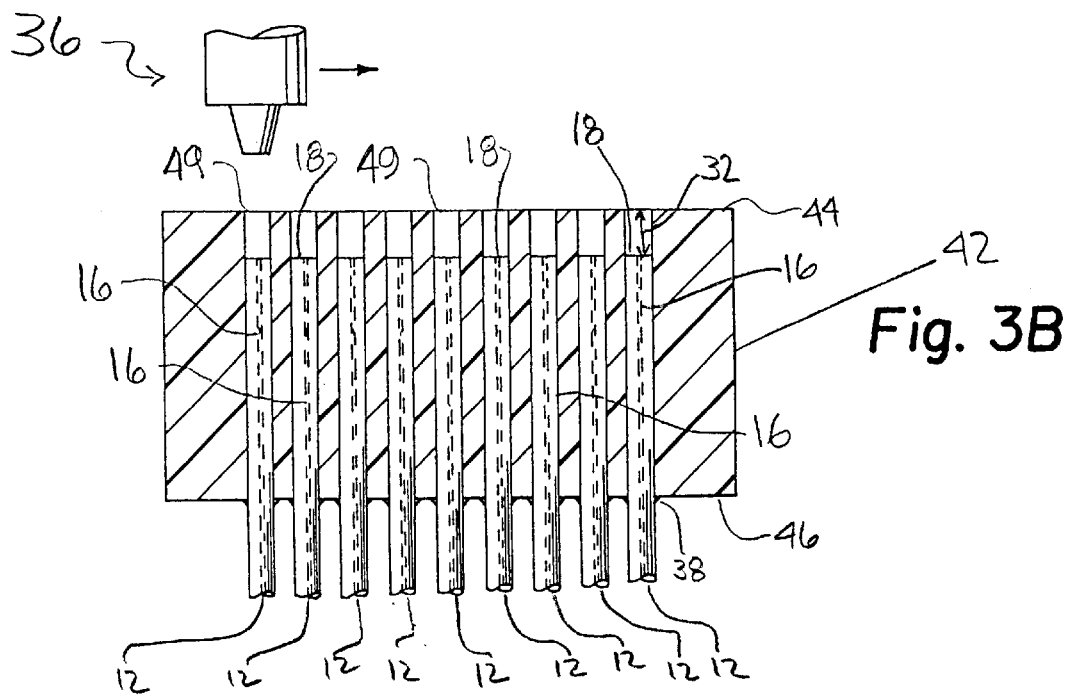
FIG. 3B is a cross-sectional view of the ferrule of FIG. 3A showing optical fibers placed within the ferrule openings and the relative location of the printhead and its axis of movement parallel to the top surface of the ferrule permitting it to deposit microlens material in multiple openings without movement of the ferrule.

FIG. 3B is a cross-sectional view of the ferrule of FIG. 3A showing an array 50 of optical fibers 12 inserted into the ferrule. The end 18 of at least one optical fiber 12 is inserted into lower end 46 of ferrule opening 48 up to the standoff distance 32. As mentioned above for the collet embodiment of FIGS. 1–2D, the standoff distance is calculated to permit deposition of microlens material to form a microlens having a focal point at the tip of the core 16 of the optical fiber 12. Also shown in FIG. 3B is the relative position of the ink-jet printhead 36 to the ferrule 42 and its ability to move across a stationary ferrule in an embodiment of the invention. Alternatively, it is also contemplated that the ink-jet printhead may be held stationary and the ferrule may be moved laterally during deposition of microlens material.

Figure 3C:
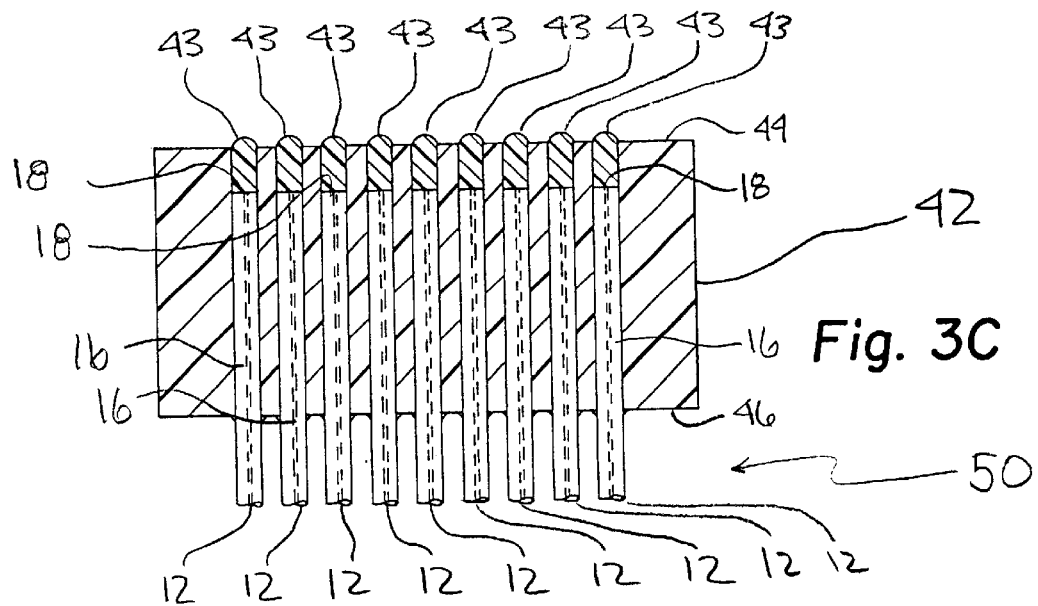
FIG. 3C is a cross-sectional view of the ferrule of FIGS. 3A and 3B showing optical fibers placed within the ferrule openings and microlens material deposited according to the method of the present invention to create a collimating lenslet on the end of each fiber of the array of fibers.
Figure 4:
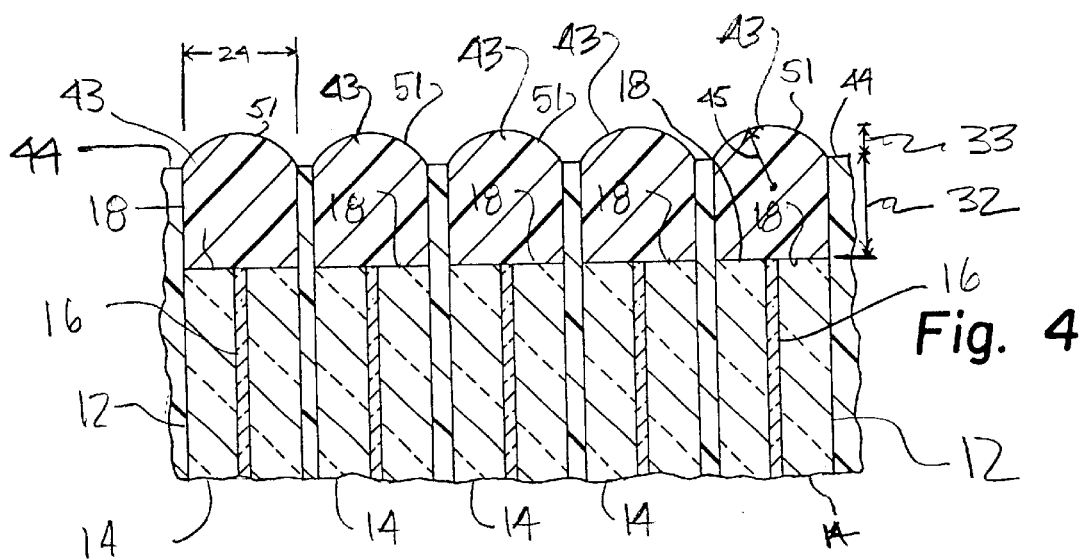
FIG. 4 is an enlarged cross-sectional view of the ferrule of FIG. 3C showing the optical fibers and associated microlenses after the execution of the method of the present invention.

FIG. 3C shows the placement of a plurality of collimating microlenses or lenslets 43 on the ends 18 of multiple fibers 12 of a fiber array 50 according to an embodiment of the present invention. Microens placement is shown more closely in FIG. 4 which is an enlarged view of FIG. 3A. Deposition of microlens material is performed similarly as to that using a collet. The microlens material should be deposited in droplets along the center axis of the opening rather than along the sides of the ferrule opening to avoid surface tension forces between the microlens material and the ferrule. Deposition of the microlens material is understood to extend above the upper end 44 of the ferrule 42 to produce a radiused outer surface 51 as shown in FIG. 4. A generally spherical microlens having a diameter about equal to the diameter of the openings in the ferrule are preferred but are not necessary to produce a collimating microlens. The diameter 24 of the microlens or lenslet 43 preferably is large enough to capture essentially all of the divergent light from the optical fiber at radius of curvature sufficient to achieve collimation of light. Lenses using a collet or ferrule are preferably all the same diameter 24.

The microlens material can be any material that permits light transmission such as glass, plastic, epoxy, etc. UV-curable optically transparent epoxies are preferred. Like that for use with a collet, in forming a microlens with a ferrule the viscosity of the microlens material at room temperature is preferably not over 1000 centipoise. At application, the viscosity of the microlens material is preferably 40 centipoise or less. If it is not, the viscosity can be lowered by either heating, mixing, or mixing with a solvent. If a solvent is used, heat application after deposition of the material may be required to drive off the solvent but because this often results in shrinkage, distortion, or both, of the microlens, it is not preferred although it is acceptable with the present invention.

To promote repeatability and uniformity of fabrication among lenses, an integral number of droplets of the same material is used in one embodiment of the invention. Droplet volume, microlens height 33, standoff distance 32, and microlens diameter 24 (as in FIG. 1) are four parameters necessary to calculate an integral number of drops sufficient to build a microlens. As illustrated in FIG. 1, microlens height 33 is the height the most distal extent that the microlens extends out of the upper end 26 of the collet 20. The preferred diameter of microlens 10, 43 should be large enough to capture essentially all of the divergent light from the optical fiber and a radius of curvature sufficient to achieve collimation of light. Ray-trace modeling and beam analysis yield a first approximation of height 33 and radius of curvature 35 and 45 of microlens 10, 43. The use of a beam analyzer is known to one of ordinary skill in the art to determine the degree of collimation. These parameters can be then adjusted slightly to arrive at an integral number of droplets necessary to form a collimating lens. To build lenses with each lens having a different radii of curvature, droplet size or number may be varied during deposition of microlens material. This should be confirmed empirically.

According to a preferred embodiment of the invention as shown in FIG. 1, a desired microlens geometry for light rays requiring collimation width of 0.20 mm, a numerical aperture of 0.13, a cladding diameter of 0.125 mm, and a microlens material having an index of refraction of 1.528 were calculated using the Zemex Optical Design Program 9.0 (Focus Software, Inc., P.O. Box 18228, Tucson Ariz. 85731) for ray-trace modeling. Numerical aperture (NA) is a measure of light divergence generally known to one of ordinary skill in the art. Collimated light, by definition, is not divergent; consequently, a collimating microlens reduces the NA to near zero. The collimation width, numerical aperture, cladding diameter, and the index of refraction of the microlens material determine the values for the microlens diameter 24, standoff distance 32, and microlens height 33 necessary to achieve collimation of light. Based upon these requirements, the optimal microlens geometry was determined to require a microlens diameter of 0.90 mm, a microlens height of 0.415 mm, and a standoff distance of 0.893 mm.

With respect to the embodiment of FIG. 1, optical fiber 12 is inserted by entering the lower end 28 of the collet first then sliding it in up the standoff distance 32 of 0.893 mm from the upper end of the collet 26. According to the preferred embodiment, the fiber 12 is attached to the collet 20 by a UV-curable epoxy. A quartz collet is preferred because it transmits UV light used to cure the UV-curable adhesive epoxy to fix the fiber to the collet 20. Following bonding of the collet 20 to the optical fiber 12, the fiber-collet assembly 40 is mounted vertically, open end up, to a printing station substrate chuck and aligned to the print axis. The ink-jet printhead 36 next ejects 40–60 $\mu$m diameter droplets of UV-curable optical epoxy into upper end 26 of collet 20, as in FIG. 2C, until it is filled to the upper end 26 of the collet 20 then additional drops of the optical epoxy are ejected to build a generally spherical microlens surface 22 of the targeted radius of curvature 35 on the top. The outside edge of the collet restricts the flow of deposited material, enabling the radius of curvature to be varied over a significant range. Finally, the microlens material is cured. According to the preferred embodiment, the optical UV-curable epoxy is cured by exposing it to UV light followed by heating at 120° C. for 1 hour.

I claim:

1. A method of fabricating collimating microlenses for the ends of optical fibers by means of ink-jet printing comprising:

selecting a desired lens geometry;

providing a hollow collet having an opening therethrough sized to accept an optical fiber, the collet having open lower and upper ends;

inserting the tip of an optical fiber into the open lower end of the collet;

fixing the optical fiber in the collet with its tip spaced from the upper end of the collet by a standoff distance which will place the focal length of the microlens to be formed at the tip of the optical fiber;

depositing droplets of fluid microlens material into the open upper end of the collet by means of an ink-jet printhead until the opening within the collet is filled and a microlens of the desired geometry is formed thereon, and curing the microlens material.

2. The method of claim 1 wherein the step of selecting a desired lens geometry comprises selecting a microlens diameter large enough to capture essentially all of the divergent light from the optical fiber and a radius of curvature sufficient to achieve collimation of said light.

3. The method of claim 2 wherein the step of providing a hollow collet further includes the step of providing a collet diameter commensurate with the diameter of the microlens to be formed.

4. The method of claim 2 wherein the step of depositing droplets of microlens material comprises the step of depositing droplets of microlens material curable by means of heat and the step of curing the microlens material comprises the step of heating the microlens material.

5. The method of claim 2 wherein the deposited microlens material is curable by radiation and the step of curing the microlens material is accomplished by the step of impinging the microlens material with said radiation.

6. The method of claim 5 wherein the microlens material is curable by ultraviolet radiation and said radiation is ultraviolet radiation.

7. The method of claim 2 wherein the step of depositing droplets of fluid microlens material comprises the step of depositing a finite number of droplets of substantially uniform size to facilitate repeatability and uniformity of fabrication of multiple collimating microlenses.

8. The method of claim 2 wherein the step of providing said collet comprises the step of providing a quartz collet.

9. A method of fabricating collimating microlenses for the ends of optical fibers within a fiber array by means of inkjet printing, comprising:

selecting a collimating microlens having a diameter, radius of curvature and focal length;

providing a ferrule having a plurality of openings therethrough, the openings having a lower end and an upper end and being sized to accept separated optical fibers from a fiber array;

inserting the tips of separate optical fibers in the lower ends of the plurality of openings and fixing the fibers in the ferrule with their tips at the focal length of the selected collimating microlens;

forming pedestals of microlens material extending from the tips of the optical fibers to the top of the ferrule by depositing droplets of fluid microlens material into the upper ends of the plurality of openings of the ferrule using an ink-jet printhead;

building collimating microlens above each of the upper ends of the plurality of openings in the ferrule using said printhead; and curing the microlens material in the ferrule.

10. The method of claim 9 wherein the step of selecting a collimating microlens comprises selecting a microlens diameter large enough to capture essentially all of the divergent light from the optical fiber at a radius of curvature sufficient to achieve collimation of said light.

11. The method of claim 9 wherein the step of providing a ferrule have a plurality of openings therethrough includes the step of arranging said openings in an array with each opening closely adjacent to the next opening.

12. The method of claim 9 wherein the step of building collimating microlenses above each of the upper ends of the plurality of openings in the ferrule using the ink-jet printhead comprises the step of depositing a finite number of droplets of microlens material of substantially uniform size to facilitate repeatability and uniformity of sequential fabrication of each of said collimating microlenses.

13. The method of claim 12 wherein the step of building collimating microlenses above each of the upper ends of the plurality of openings in the ferrule using the ink-jet printhead comprises the step of producing generally spherical microlenses having a diameter about equal to the diameter of the openings in the ferrule.

14. The method of claim 13 wherein the deposited microlens material is curable by radiation and the step of curing the microlens material is accomplished by the step of impinging the microlens material with said radiation.

15. The method of claim 14 wherein the microlens material is curable by ultraviolet radiation and said radiation is ultraviolet radiation.

16. The method of claim 12 wherein the step of providing a ferrule having a plurality of openings therethrough comprises the step of providing a plastic ferrule having said plurality of openings.

17. The method of claim 9 further comprising the step of applying a de-wetting solution to said upper end of said ferrule after the step of providing a ferrule having a plurality of openings therethrough, and before the step of inserting the tips of separate optical fibers in the lower ends of the plurality of openings.

18. The method of claim 17 wherein said de-wetting solution is a flourinated acrylic composition.

19. The method of claim 1 wherein said opening of said upper end of said collet may be enlarged to permit entry of said droplets of fluid microlens material.

20. The method of claim 1 wherein the viscosity of said droplets of fluid microlens material is 40 centipoise or less during the step of depositing the lens material.

21. The method of claim 1 further comprising the step of heating said fluid microlens material before the step of depositing said droplets.

22. The method of claim 21 wherein the viscosity of said fluid microlens material at room temperature before heating is less than 1000 centipoise.

23. The method of claim 21 wherein the viscosity of said droplets of fluid microlens material after heating is less than 40 centipoise.

* * * * *